May 19, 1925.
J. C. CLAUDEPIERRE
KITCHEN CHUTE
Original Filed Jan. 25, 1921
1,538,239
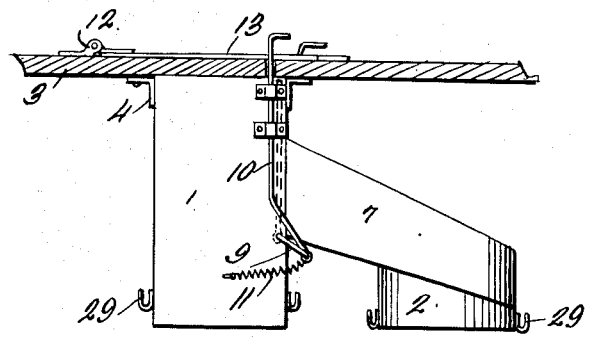
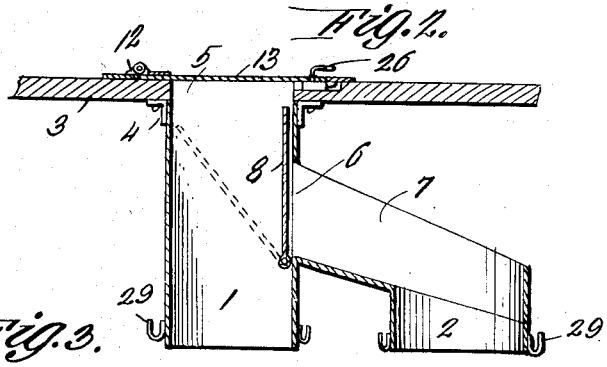
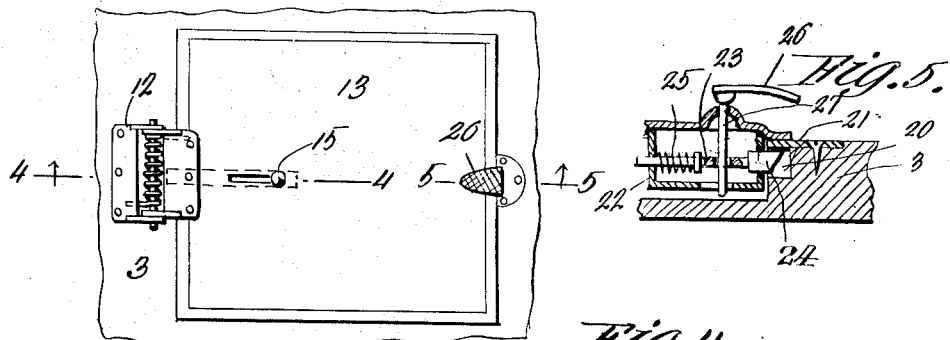
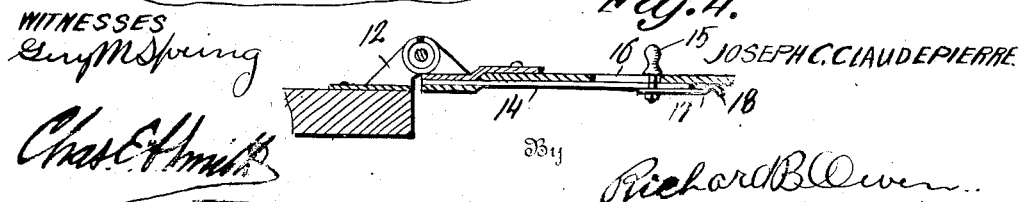
WITNESSES
JOSEPH C. CLAUDEPIERRE
By Richard B. Owen
Attorney Patented May 19, 1925.

1,538,239

UNITED STATES PATENT OFFICE.

JOSEPH C. CLAUDEPIERRE, OF AKRON, OHIO.

KITCHEN CHUTE.

Application filed January 25, 1921, Serial No. 439,887. Renewed September 15, 1924.

*To all whom it may concern:*

Be it known that I, JOSEPH C. CLAUDEPIERRE, a citizen of the United States, residing at Akron, in the county of Summit and State of Ohio, have invented certain new and useful Improvements in a Kitchen Chute, of which the following is a specification.

This invention relates to a kitchen chute and has for its principal object the production of a device of this nature whereby the sweepings from the floor may be delivered to a suitable receptacle without the necessity of using the usual dust pan.

A further object of the invention is the production of a device of this nature whereby the inflammable sweepings may be separated from the non-inflammable sweepings and delivered to separate receptacles.

A still further object of the invention is to generally improve upon chutes of this character by providing a device which will be extremely simple, durable and inexpensive construction, one which is efficient and reliable in operation and well adapted to the purpose for which it is designed.

With these and numerous other objects in view, the invention resides in certain novel features of construction, and the combination and arrangement of parts as will be hereinafter fully described and claimed.

In the drawings:—

Figure 1 is a side elevation of the kitchen chute showing same in position for use.

Figure 2 is a vertical section of an apparatus embodying my invention.

Figure 3 is a top plan view of the chute.

Figure 4 is a section taken on the line 4—4 of Figure 3, and

Figure 5 is a section taken on the line 5—5 of Figure 3.

By referring to the drawings by numerals it will be seen that 1 designates the primary chute and the numeral 2 designates the secondary chute. The primary chute 1 is hung from the bottom of the floor 3 by any suitable brackets such as shown at 4 so as to register with an opening 5 provided in the floor 3. The chute 2 communicates with the chute 1 through the opening 6 from which leads the extension 7. This extension 7 is provided with a bottom and side walls and communicates with the top of the auxiliary chute 2. A trap door 8 is hingedly mounted within the chute 1 adjacent the opening 6 and is provided with the crank 9 attached to the rod 10. A spring 11 is also attached to this crank 9 and normally retains the trap bar 8 in a vertical position thus closing the communication between the chute 1 and the extension 7 as is clearly shown in Figure 2 of the drawing. By referring to the same figure it will be seen that by pulling upwardly upon the rod 10 the trap door 8 will take the position shown in dotted lines thus causing the refuse to pass through the passage 7 into the auxiliary chute 2. Of course it will be understood that this rod 10 extends through an aperture provided in the floor 3 and is provided with any suitable handle upon the top thereof.

A hinge 12 of any preferred construction is mounted upon the top of the floor 3 adjacent the opening 5 so as to hingedly mount the cover 13 over this opening. This hinge 12 is provided with a spring for normally holding the cover 13 in an open position. A flat bar 14 is slidably mounted upon the bottom of the cover 13 so as to pass over the leaf of the spring 12 situated upon the floor 3 and thus hold the cover in a lowered or closed position. A handle 15 is provided upon the flat bar 14 and extends through the slot 16 in the cover 13 so that this bar may be easily operated for the purpose specified. A leaf spring 17 is provided upon the end flat bar 14 and has a curved end 18 which is in frictional engagement with the lower surface of the cover 13 thus causing sufficient friction so as to retain the bar in a set position and prevent casual accidental movement thereof.

It will be understood that the bar 14 is used when it is desired to keep the cover closed for an extended period of time. When the cover is to be used at frequent intervals another locking means is provided upon the free end of the cover 13. This locking means is more particularly disclosed in Figure 5 of the drawing. The cutaway portion 20 is provided in the floor 3 adjacent the opening 5 and a plate 21 is situated thereover. A housing 22 is mounted upon the under surface of the cover 13 at the free end thereof so as to register with the cutaway portion 20. A rod 23 is slidably mounted within the casing 22 and is provided with the latch 24 upon the outer end thereof which will engage the plate 21 for holding the cover in a closed position. A spring 25 is situated upon this rod 23 so as to normally hold the latch in an extended position. In order to retract the latch a foot pedal 26 is provided having the extension 27 which passes through an opening provided intermediate the ends of the rod 23 and the end thereof extends through a slot in the bottom of the housing 22. It will be readily seen that by pressing downwardly upon the foot pedal 26 the rod 23 will be pushed sufficiently so as to cause the latch 24 to clear the plate 21.

In actual use bags or receptacles will be hung from the chutes 1 and 2 and hooks 29 are provided upon the lower ends thereof for this purpose.

From the foregoing description, taken in connection with the accompanying drawing, the construction and operation of the device will be readily understood without a more extended explanation. As numerous changes in form, proportion, and in the minor details of construction may be restorted to without departing from the spirit of this invention, I do not wish to be limited to the construction herein shown and described other than as claimed.

Matter disclosed herein but not specifically claimed is described and claimed in a copending case of the present inventor, Serial No. 722,068, filed June 24, 1924, which is a continuation, in part, of the present case.

Having thus described my invention what I claim as new is:—

1. In a household appliance, the combination with a floor having an opening therein, of a straight primary chute depending from the floor having its upper end communicating with the opening in the floor and its lower end open to permit the passage of trash and the like through the floor opening directly through the chute, brackets connecting the straight primary chute to the floor, a cover for the chute carried by the floor, the primary chute having an opening formed therein intermediate its ends, an inclined secondary chute communicating with the opening in the primary chute, a combined closure and guide plate for the secondary chute arranged in the primary chute and adapted to swing across the primary chute for directing trash and the like into the secondary chute and for swinging movement across the opening for preventing the passage of trash and the like into the secondary chute, and means disposed above the floor for operating the combined closure and guide plate.

2. In a device of the character described, a floor having an opening therein, a cover for said opening, means for conducting material into a receptacle located directly below said opening, means for conducting material into a second receptacle located adjacent the first receptacle and a deflecting device movable beneath the opening and adapted to direct waste material into the second means.

3. In a device of the character described, a floor having an opening therein, a cover for said opening, means for conducting material into a receptacle located directly below said opening, means for conducting material into a second receptacle located adjacent the first receptacle, and a shiftable deflecting device movable beneath the opening and adapted to direct waste material into the second means.

4. In a device of the character described, a floor having an opening therein, a cover for said opening, a plurality of means for conducting material into waste receptacles beneath the floor and means to direct selectively the waste material into one of said means.

5. In a device of the character set forth, a floor having an opening therein, a cover for said opening, a plurality of means for conducting material into waste receptacles beneath the floor and adapted to receive waste from the opening by gravity, and a deflecting device movable across the opening into position to direct the waste material into one of said means.

6. In a device of the character set forth, a floor having an opening therein, means for conducting material into a plurality of waste receptacles beneath the floor and adapted to receive waste from the opening by gravity, and a deflecting device movable into position below the opening and adapted to direct the waste material into one of said receptacles.

7. In a device of the character set forth, a floor having an opening therein, a plurality of means for conducting material into waste receptacles beneath the floor and adapted to receive waste from the opening by gravtiy and a deflecting device movable so as to direct waste material into one of said means.

8. In a device of the character set forth, a floor having an opening therein and a device beneath the opening movable so as to deflect waste material and means for moving said device operable from above the floor.

In testimony whereof I affix my signature in presence of two witnesses.

JOSEPH C. CLAUDEPIERRE.

Witnesses:
S. E. RINKER,
R. A. GRAVES.